(12) United States Patent
Fling

(10) Patent No.: US 6,459,266 B1
(45) Date of Patent: Oct. 1, 2002

(54) SONDE LOCATOR

(75) Inventor: Richard William Fling, Saliford (GB)

(73) Assignee: Radiodetection Limited, Bristol (GB)

( * ) Notice: Subject to any disclaimer, the term of this patent is extended or adjusted under 35 U.S.C. 154(b) by 0 days.

(21) Appl. No.: 09/491,797

(22) Filed: Jan. 26, 2000

(30) Foreign Application Priority Data

Jan. 26, 1999 (GB) .............................. 9901708

(51) Int. Cl.$^7$ ...................... G01V 3/08; G01V 3/165
(52) U.S. Cl. ......................................... 324/326; 175/45
(58) Field of Search .......................... 324/326, 327, 324/328, 329, 346, 344, 345, 207.26, 207.17; 175/45, 26

(56) References Cited

U.S. PATENT DOCUMENTS

| | | | |
|---|---|---|---|
| 4,323,848 A | * 4/1982 | Kuckes ........................ 324/338 |
| 4,438,401 A | 3/1984 | Iwamoto et al. | |
| 4,710,708 A | * 12/1987 | Rorden et al. ......... 324/207.26 |
| 4,825,165 A | * 4/1989 | Helms et al. ................ 324/323 |
| 5,122,750 A | * 6/1992 | Rippingale et al. ......... 324/326 |
| 5,321,361 A | * 6/1994 | Goodman .................... 324/326 |
| 5,917,325 A | * 6/1999 | Smith .......................... 324/326 |

FOREIGN PATENT DOCUMENTS

| WO | WO88/04436 A1 | 6/1988 |
| WO | WO90/00259 A1 | 1/1990 |

* cited by examiner

*Primary Examiner*—Jay Patidar
(74) *Attorney, Agent, or Firm*—Baker & Hostetler LLP

(57) ABSTRACT

In order to locate an inaccessible object such as an underground boring tool, the inaccessible object having means, for example a solenoid, to generate a magnetic field, a locator is provided with a detector for detecting the generated magnetic field. The detector may be an aerial array of three mutually perpendicular coils. When the locator is moved from a first position to a second position errors may arise in the measurements due to misalignment of the locator. In order to minimise such errors, a magnetic compass is provided on the locator to ensure that the locator can be maintained in the same position relative to the Earth's magnetic field. The magnetic compass is not affected by the magnetic field generated by the solenoid as this magnetic field is an A.C. magnetic field.

5 Claims, 2 Drawing Sheets

SONDE LOCATOR

BACKGROUND OF THE INVENTION

1. Field of the Invention

The present invention relates to a locator for determining the position of a sonde. Such a sonde may, for example, be mounted on a boring tool and may generate electromagnetic signals which enable the position of that boring tool to be determined by the locator.

2. Description of Related Art

In WO 96/29615 corresponding to U.S. Pat. No. 5,917,325, the disclosure of which is incorporated herein by reference, we discussed an arrangement for locating an underground boring tool in which a magnetic field generated by a solenoid was detected at two measuring locations. Use may be made of the relationship between the axial and radial fields of the solenoids, and a tilt sensor was included to indicate if the axis of the solenoid was not horizontal. The solenoid and tilt sensor may then be incorporated in a sonde. In general, the locator uses an aerial array to measure field components in three mutually perpendicular directions. Using amplitude and phase data from each aerial array, the location of the sonde, and hence the boring tool, can be determined.

Thus, as shown in FIG. 1, an underground boring tool 10 has a sonde 11 which contains a solenoid which generates a magnetic field, with the axis 12 of the solenoid being aligned with the longitudinal axis of the boring tool 10. The axis 12 will be the direction of movement of the boring tool, unless the boring tool is diverted by ground variation or obstacles, or by deliberate steering action. A locator having an aerial array comprising three coils $X_3$ $Y_3$ and $Z_3$ will, when placed directly above the sonde 11 and in alignment with it so that the $Y_3$ coil is parallel to the axis 12, the $Z_3$ coil is perpendicular to the axis in a way which makes that coil $Z_3$ vertical when the axis 12 is horizontal, have a maximum signal in the direction axis 12 with the $X_3$ and $Y_3$ coils detecting a null field. Any diversions from this position will result in signals from the $X_3$ and $Z_3$ coils, which signals will vary in amplitude and phase according to the extent and direction of such divergence. A similar arrangement will apply if the locator is positioned ahead of the sonde 11 although the signal magnitude will then be reduced due to distance. In tracking a boring tool, it is common to position a locator ahead of the tool in the anticipated direction of its motion.

However, if the locator is not correctly aligned, an incorrect measurement will result. Whilst the operator may endeavour to maintain the orientation of the locator relative to the boring tool 10, this is not always reliable since the boring tool cannot be seen.

SUMMARY OF THE INVENTION

A locator is provided with a detector for detecting the magnetic field generated by, for example, a solenoid in an inaccessible object which might be an item such as an underground boring tool. The detector preferably comprises an aerial array of three mutually perpendicular coils for detecting the generated magnetic field. When the locator is moved from a first position to a second position errors may arise in the measurement due to misalignment of the locator. In order to minimize such errors, a magnetic compass is provided on the locator to insure that the locator can be maintained in the same position relative to the earth's magnetic field. The magnetic compass is not affected by the magnetic field generated by the solenoid as this magnetic field is an A.C. magnetic field.

BRIEF DESCRIPTION OF THE DRAWINGS

An embodiment of the present invention will now be described in detail, by way of example, with reference to the accompanying drawings, in which.

DESCRIPTION OF THE PREFERRED EMBODIMENT

Figure 1:
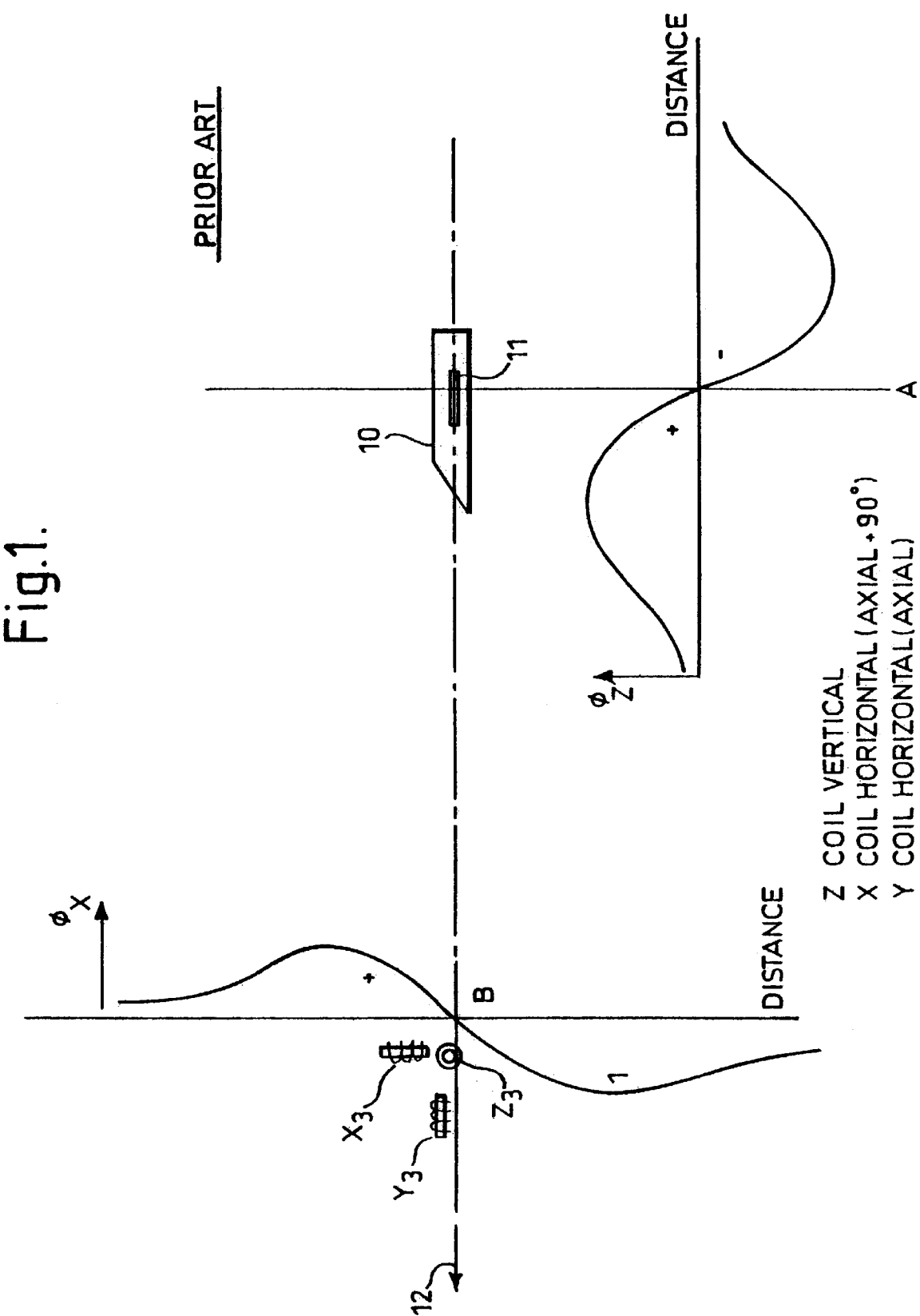
FIG. 1 shows fields generated by a solenoid-containing sonde, and has already been discussed.
Figure 2:
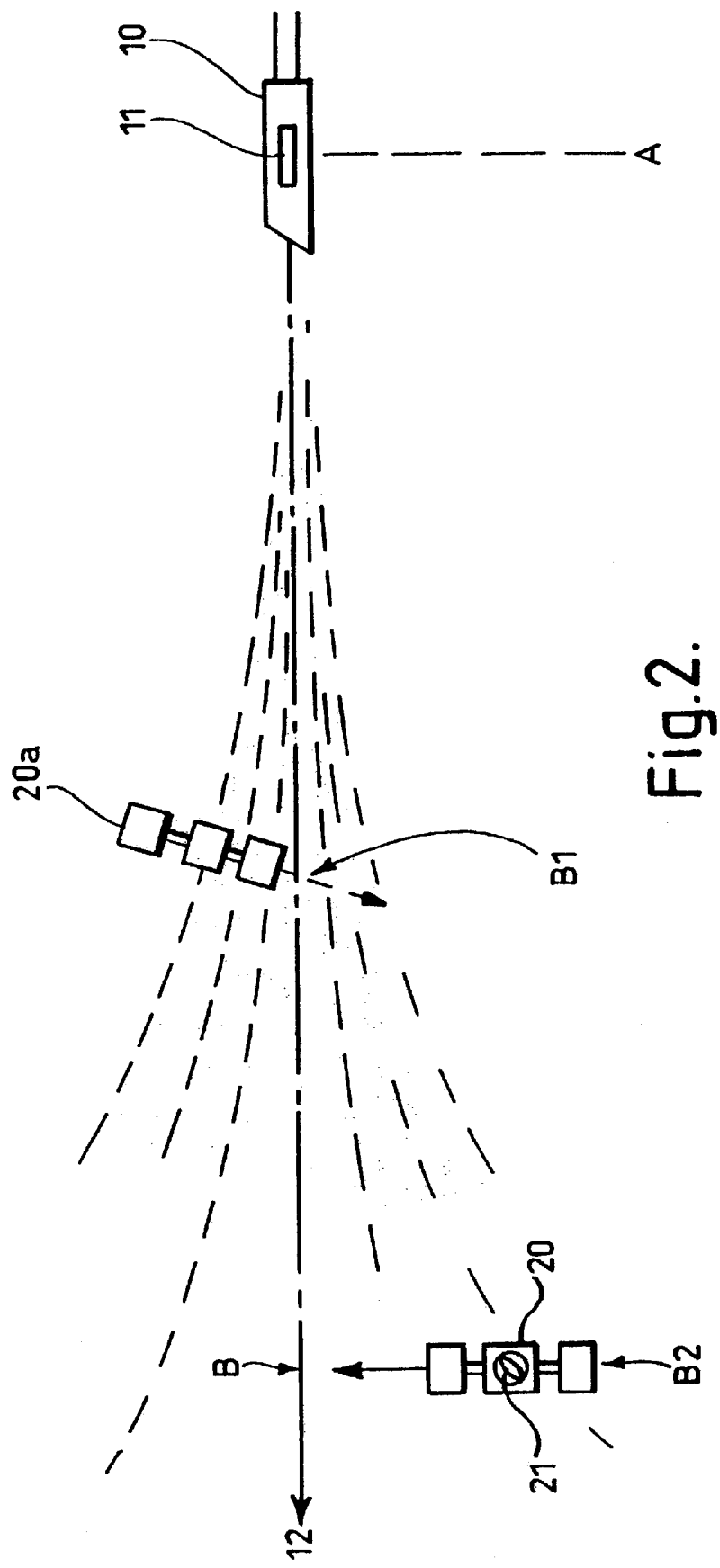
FIG. 2 shows location of a boring tool using a locator according to the present invention.

Referring to FIG. 2, an underground boring tool 10 has a sonde with a solenoid generating a magnetic field, the axis of the solenoid being shown at 12. This arrangement is similar to that shown in FIG. 1 and corresponding components will be indicated by the same reference numerals. In order to achieve satisfactory location of the boring tool 10 using a locator 20, the operator seeks to place the locator 20 directly ahead of the boring tool 10 at a position B. In order to do this, it is usual for the operator first to place the locator 20 slightly to one side of the expected line of the axis 12, at position B2 in FIG. 2 and then move the locator 20 until it coincides with the axis 12, on the basis of amplitude and phase measurements from the coils of the locator 20. The coils are as in FIG. 1, and will not be described in more detail now.

If a locator 20a is mis-aligned with the axis 12, and moved toward the axis to a position B1, measurements is taken by the locator 20a may be incorrect.

Therefore, in accordance with the present invention, the locator 20 has thereon a magnetic compass 21. The compass points NS, and so defines the orientation of the locator 20 relative to the Earth's magnetic field. Therefore, when the locator 20 is moved from one position to another, e.g. from a position over the boring tool 1 to the position B2 in FIG. 2, the locator can ensure that the compass orientation remains unchanged, so that the locator 20 has the same orientation relative to the Earth's magnetic field. Thus, mis-alignments such as shown at position B1 in FIG. 2 can be avoided. Hence, incorrect measurements may be avoided. Note that the compass 21 is unaffected by the magnetic field from the sonde 2, which field is shown schematically by dotted lines, because such a field is an A.C. field.

At its simplest, the magnetic compass 21 may be a simple compass of conventional type, such as those used by walkers, since all that is needed is for the operator of the locator to have a visual indication of the direction to the boring tool. However, it is also possible to use other compass arrangements. In particular, the need to record a compass bearing at the initial position can be obviated if the compass is provided with an adjustable pointer or marked bezel, which can be set to match the north point of the needle, in a similar manner to the setting of a barometer pointer to its last reading. By turning the locator until the needle and adjustable mark correspond, the operator then knows that the locator has its original orientation.

Other arrangements such as magnetometer or 'solid-state' compasses or gyroscopic devices might find application in some circumstances.

What is claimed is:

1. A method for detecting the relationship between a locator and an inaccessible object, said inaccessible object having means for generating a magnetic field and said locator having detecting means for detecting the generated magnetic field and a magnetic compass, the method comprising:

(a) measuring horizontal and vertical components of said generated magnetic field using the locator in a first position;

(b) processing said measurements to determine the separation of said inaccessible object from said locator in the first position;

(c) moving said locator to a second position and using said compass to ensure that said locator has the same orientation relative to the Earth's magnetic field as in said first position;

(d) measuring horizontal and vertical components of said generated magnetic field using the locator in the second position; and, (e) processing said measurements to determine the separation of said inaccessible object from said locator at the second position.

2. A method according to claim 1 wherein said generated magnetic field is an A.C. magnetic field.

3. A method according to claim 1 wherein said magnetic compass has a display which is visible from the outside of said locator.

4. A method according the claim 1, wherein said means for generating a magnetic field is a solenoid.

5. A method according to claim 1, wherein the inaccessible object is a boring tool.

* * * * *